United States Patent
Plymale et al.

(10) Patent No.: US 6,174,470 B1
(45) Date of Patent: Jan. 16, 2001

(54) METHOD FOR BLOW-MOLDING AN AUTOMOTIVE INSTRUMENT PANEL HAVING AN INTEGRAL AIRBAG DOOR

(75) Inventors: Bradley Richard Plymale, Canton; Christopher Alan Myers, Holly; Gerald Arthur Heath, Canton; Jeffrey Hampton Helms, Plymouth; Lisandro Trevino, Ann Arbor; Sorin Stancu, Dearborn, all of MI (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/205,315

(22) Filed: Dec. 4, 1998

(51) Int. Cl.$^7$ .................................................. B29C 45/14
(52) U.S. Cl. ....................... 264/46.1; 264/46.4; 264/513; 264/514; 264/173.15; 264/515
(58) Field of Search ................................. 264/45.1, 45.2, 264/45.8, 45.9, 46.1, 46.4, 51, 513, 514, 515, 171.1, 171.13, 173.11, 173.12, 173.15, 176.1; 156/77, 78, 79

(56) References Cited

U.S. PATENT DOCUMENTS

| 3,622,176 | 11/1971 | Byer . | |
|---|---|---|---|
| 4,891,081 | * 1/1990 | Takahashi et al. | 264/45.2 |
| 5,172,931 | 12/1992 | Baba et al. . | |
| 5,318,822 | 6/1994 | Rhodes . | |
| 5,320,380 | 6/1994 | Hamada et al. . | |
| 5,328,651 | 7/1994 | Gallagher et al. . | |
| 5,335,935 | 8/1994 | Proos et al. . | |
| 5,421,608 | 6/1995 | Parker et al. . | |
| 5,522,616 | * 6/1996 | Bauer et al. | 280/728.2 |
| 5,533,748 | 7/1996 | Wirt et al. . | |
| 5,536,037 | 7/1996 | Cherry . | |
| 5,700,050 | 12/1997 | Gonas . | |
| 5,772,240 | 6/1998 | Vavalidis . | |

FOREIGN PATENT DOCUMENTS

| 63-2741 | 1/1988 | (JP) . |
|---|---|---|
| 63-242736 | 10/1988 | (JP) . |
| 6-107038 | 4/1994 | (JP) . |
| 7-080915 | 3/1995 | (JP) . |

* cited by examiner

Primary Examiner—Jan H. Silbaugh
Assistant Examiner—Kenneth M. Jones
(74) Attorney, Agent, or Firm—Damian Porcari

(57) ABSTRACT

A method for forming an automotive instrument panel having a concealed door comprising a series of steps. A plastic parison is extruded to form the substrate layer of the instrument panel. The parison has first and second walls. The parison is placed within a mold and the first wall is contacted with the second wall to form a hinge. The area of contact forms a bond between the first and second walls. A different portion of the first and second walls are contacted to form an opening path. The opening path intersects the hinge. The opening path usually has a thickness much less than the thickness of the first and second walls to form an easily fracturable area. The door swings on the hinge to open. A elongated section of material on the second wall, enables the second wall to wrap along the hinge when the door is opened.

10 Claims, 3 Drawing Sheets

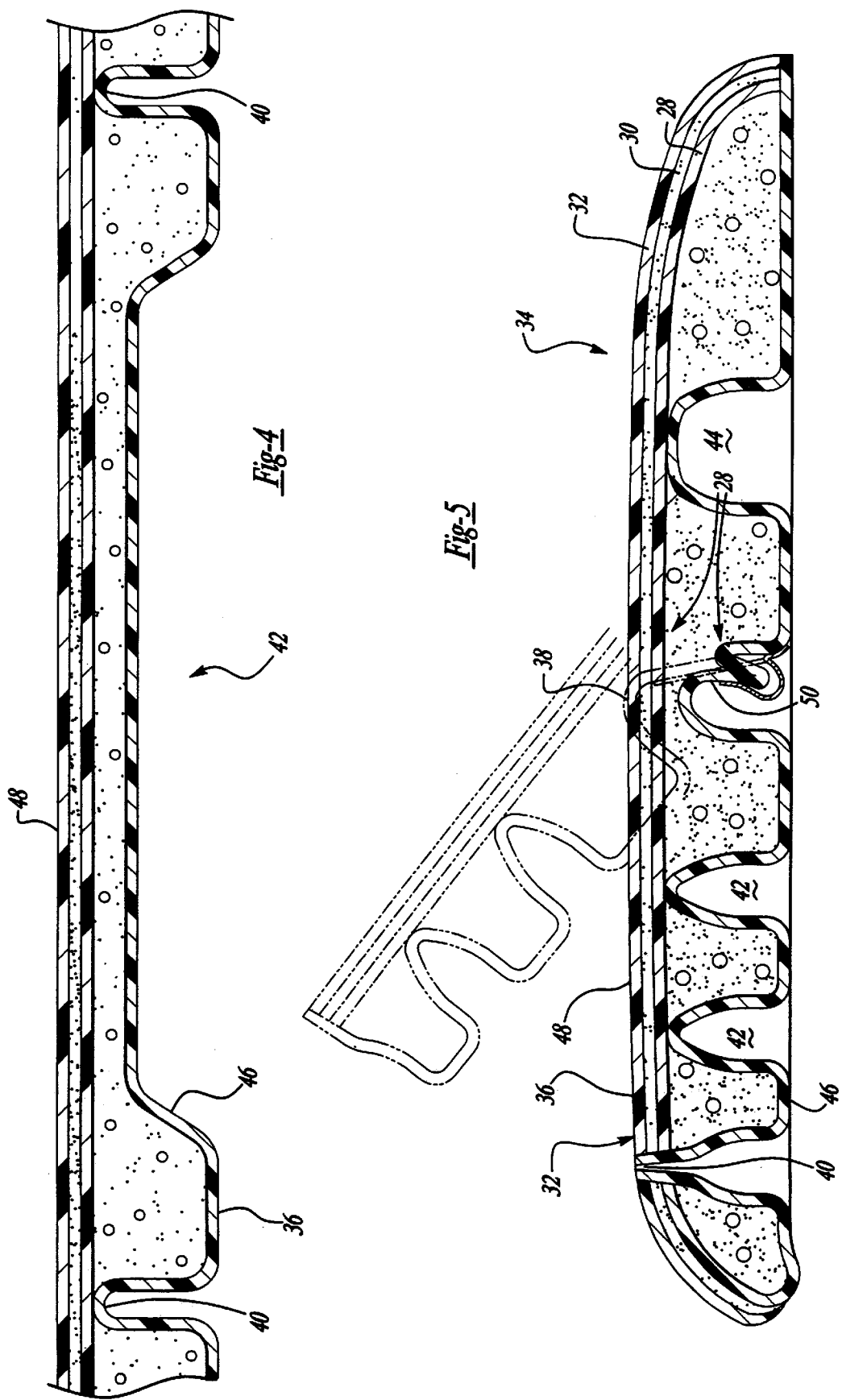

METHOD FOR BLOW-MOLDING AN AUTOMOTIVE INSTRUMENT PANEL HAVING AN INTEGRAL AIRBAG DOOR

BACKGROUND OF THE INVENTION

1. Field of the Invention

The present invention is related to a method of manufacturing a blow-molded article having an integral airbag door. More specifically, the present invention is directed to manufacturing an automotive instrument panel having an integral airbag door by simultaneously extruding the one or parison layers and blow-molding the layers to form the panel.

2. Description of the Related Arts

Modern automotive interiors utilize instrument panels that provide a soft touch feel. These instrument panels are usually formed by laminating a flexible skin to a rigid substrate. Many of these processes also included placing a foam material between the skin and substrate to provide a soft-touch feel. These instrument panels have been formed by injection molding one or more of the components of the instrument panel. While injection molding provides design flexibility, it generally requires expensive equipment and tools and does not form an article that has a hollow core.

Another trend among automobile interiors are instrument panels that have a seamless covering over an airbag door. The decorative layer of the instrument panel is used to conceal the airbag door. These instrument panels and made of the usual injection molded construction. A opening path is formed in the substrate, cover and foam to enable the door to open when the airbag is initiated. This construction provides a decorative, seamless appearance, but requires complex and expensive assembly steps for the various components of the instrument panel and airbag door.

It is also known to manufacture hollow articles by blow-molding. These articles utilize a parison extruded between two molds. The parison is inflated to cause the parison to conform to the mold walls. Among the articles that may be made using this process are instrument panels for automobiles. Japanese Patent Application Number 04-283977, filed Sep. 29, 1992, teaches molding a three-layer instrument panel using a skin layer, a foaming body intermediate layer and a base member layer. The skin layer is composed of an olefin thermoplastic elastomer composition. The intermediate layer is composed of a propylene polymer foaming body having a melt tension at 230° C. of 2–20 g. The base member layer is composed of a propylene polymer containing 10–50% by weight of a granular filler or a fibrous filler. The three layer structure is integrally molded into an instrument panel by a multi-layer blow-molding apparatus. The method and construction taught by this application is limited to a simple instrument panel structure that does not includes an integral airbag door or reinforcement supports strengthening the instrument panel.

U.S. Pat. No. 5,328,651 ('651), teaches a method of blow-molding a covering and foam backing for an automotive instrument panel. The skin and foaming material are co-extruded in a blow-molding apparatus and formed into the shaped to conform to an instrument panel. The skin and foam are then bonded to a rigid substrate that was conventionally molded. The process taught by the '651 patent is limited to forming the skin and an foam layers of the instrument panel. The underlying rigid supporting substrate is not formed by blow-molding and the instrument panel is not integrally formed.

It is desirable to form an instrument panel that utilizes blow-molding to form the outer decorative skin layer, intermediate foam layer and underlying substrate layer in a single operation. It is also desirable that the molding operation simultaneously form a concealed door within the instrument panel. The door maybe used to cover an airbag. It is also desirable that the molding operation form the instrument panel to have hollow or channel sections. The hollow or channel sections provide stiffening and rigidity to the instrument panel and allow for air or structural members to pass through the instrument panel.

These and other disadvantages are overcome by the present invention.

SUMMARY

The present invention is directed to a method for forming an automotive instrument panel having a concealed door comprising a series of steps. A plastic parison is extruded to form the substrate layer of the instrument panel. The parison has first and second walls. The parison is placed within a mold and the first wall is contacted with the second wall to form a hinge. The area of contact forms a bond between the first and second walls. A different portion of the first and second walls are contacted to form an opening path. The opening path intersects the hinge. The opening path usually has a thickness much less than the thickness of the first and second walls to form an easily fracturable area. The door swings on the hinge to open. A elongated section of material on the second wall, enables the second wall to wrap along the hinge when the door is opened.

The invention enables the integral molding of the decorative cover, foam and substrate layers using existing co-extrusion equipment. The various layers bond and fuse when the article is molded. The instrument panel may also be formed with channels that extend transversely. These channels are formed during the blow-molding process and provide areas that may be utilized to transfer air or for structural members that reinforce the instrument panel or the vehicle to which it is secured.

When the instrument panel is installed in a vehicle, an airbag is positioned behind the door. The airbag is usually secured to the second wall of the instrument panel. The airbag has sufficient force to fracture the opening path and open the door when the airbag is initiated. The opening path may be formed during the molding process or optionally, the path may be further scored with laser, heat or vibration to cause it to weaken sufficiently to open during inflation of the airbag.

The airbag door and the instrument panel is reinforced by joining the first and second walls to form box sections. These sections may include the hollow channels for air of other members. The box sections are formed when the pliable plastic walls are contacted with each other. The walls fuse to form an integral wall section.

These and other desired objects of the present invention will become more apparent in the course of the following detailed description and appended claims. The invention may best be understood with reference to the accompanying drawings wherein illustrative embodiments are shown.

BRIEF DESCRIPTION OF THE DRAWINGS

FIG. 4 is a cross-sectional view of the instrument panel shown in FIG. 3, taken along the lines 4—4.

FIG. 5 is a cross-sectional view of the instrument panel shown in FIG. 3, taken along the lines 5—5.

DETAILED DESCRIPTION OF THE PREFERRED EMBODIMENTS

Figure 1:
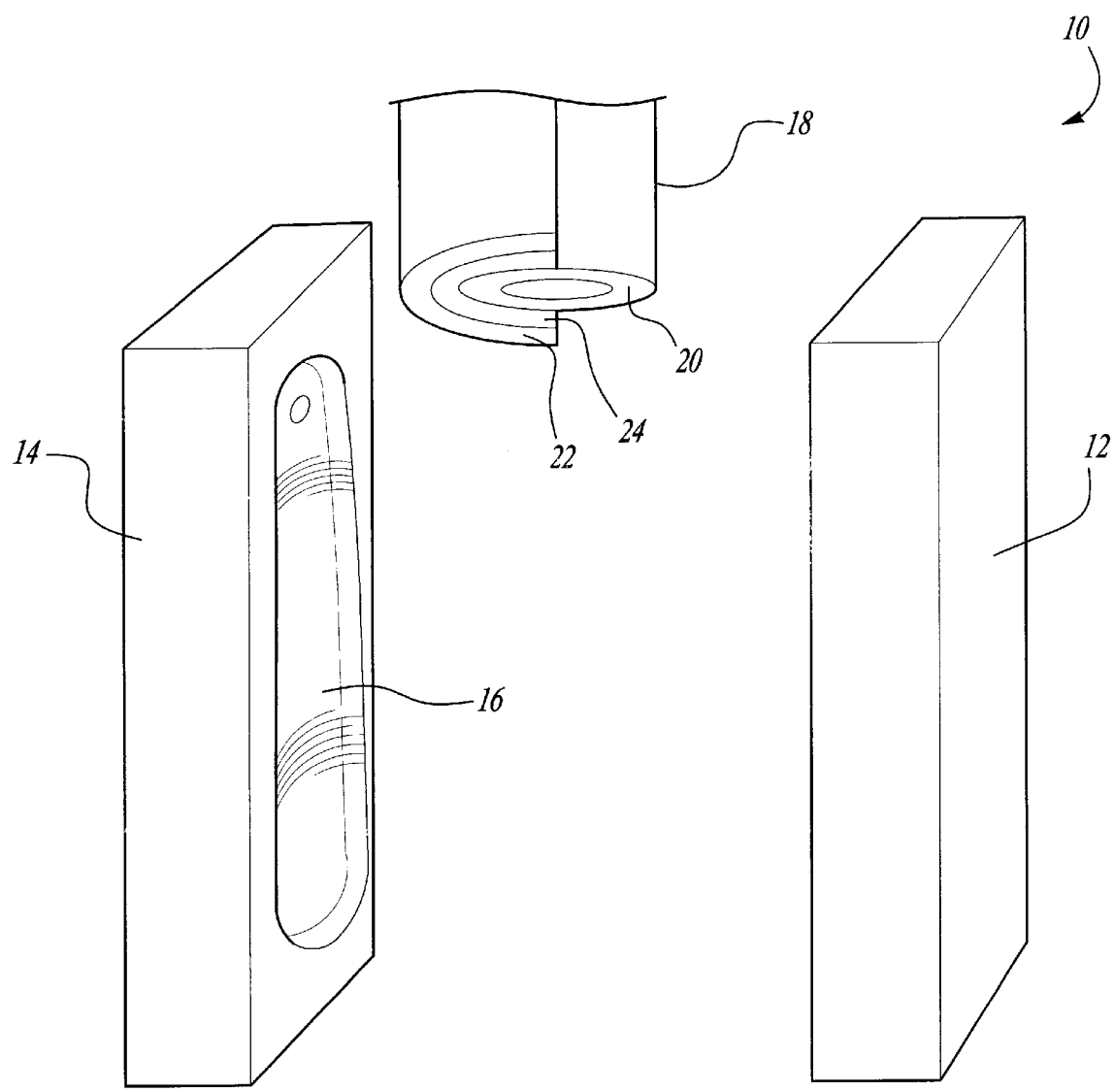
FIG. 1 is a perspective view of the blow-molding apparatus in the open position.

The present invention will be described through a series of drawings, which illustrate the blow-molding operation claimed. The invention will also be described as a method of manufacturing an automotive instrument panel, however other components may also be manufactured using the same or similar process, technique and equipment, and are included within the invention described herein.

The following items are a word list of the items described in the drawings and are reproduced to aid in understanding the invention;

10 blow-molding apparatus
12, 14 molds
16 article defining surface
18 extruder
20, 22, 24 extrusion dies
20 parison
28 substrate layer
30 foam layer
32 decorative layer
34 instrument panel
36 airbag door
38 hinge
40 opening path
42 channels
44 channel
46 first wall
48 second wall
50 excess portion
52 tether
54 foam Illustrated in FIG. 1 is a blow-molding apparatus 10. The blow-molding apparatus 10 includes two opposed molds 12, 14. The molds 12, 14 are moved towards one another to close the apparatus 10. Formed on the interior surface of the molds 12, 14 is an article defining surface 16. The article defining surface 16 imparts a shape to the blow-molded article. Positioned between the molds 12, 14 is a multi-layer extruder 18.

The extruder 18 receives a supply of plastic material which is heated and forced through the extrusion dies 20, 22, 24. The extrusion dies form the molten plastic material into thin sheets which become laminated to one another to form a parison as will be further described below. In the embodiment illustrated, the innermost extrusion die 20 forms an endless loop of material. The extrusion die 20 is circularly shaped and supplies a molten plastic material which will become the substrate of the molded article. In the article described, the substrate is generally the thickest layer of the article and the extrusion die 20 has the greatest width. The extrusion dies 22, 24 do not form an endless loop and only supply a quantity of material on a part of the substrate surface. The extrusion die 22 supplies the outermost or decorative layer of material which only covers the interior surface of an automotive instrument panel. Positioned adjacent to the extrusion die 22 is an extrusion die 24 that supplies a foam material between the decorative material and substrate to provide a resilient layer to the instrument panel. The decorative and foam layers are optional and are not needed if an instrument panel having a hard surface is desired.

Figure 2:
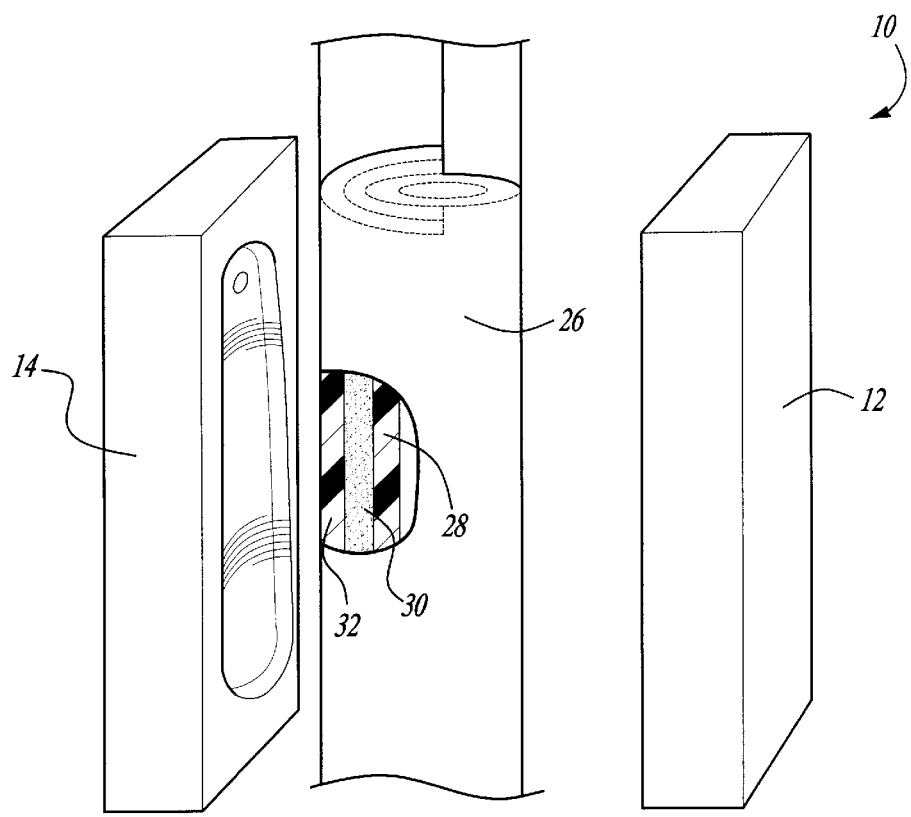
FIG. 2 is a perspective view of the blow-molding apparatus shown in FIG. 1 extruding a parison.

As illustrated in FIG. 2, the extruder 18 produces a multi-layer parison 26. The parison 26 includes an innermost substrate layer 28 having a thickness of approximately 2.3 mm. The substrate layer may be made from polymeric material. Especially preferred polymeric materials are polyethylene (PE), polypropylene (PP) and polycarbonate and Acetyl Butyl Styrene (PC/ABS). On at least a portion of the substrate layer 28 is bonded a urethane foam layer 30 having a thickness of approximately 0.2 mm. Atop the foam layer 30 is a decorative layer 32 covering the interior surface of the instrument panel. The decorative layer is also made from a polymeric material. Especially preferred polymeric materials are thermoplastic urethanes (TPU), thermoplastic olefins (TPO) and thermoplastic ethylene (TPE). The multilayer parison 26 is extruded until it has a length substantially equal to the length of the molds 12, 14. The molds 12, 14 are closed sealing the bottom and top ends of the parison 26. As is common with most blow-molding processes, the parison 26 is inflated either through a blow needle in the extruder 18 (not shown) or through a blow pin (not shown) that pierces the parison 26. The parison 26 is inflated and takes the shape of the article defining surface 16. The article defining surface 16 may include texturing features to provide a grain-like textured appearance to the instrument panel. To provide high definition grain on the decorative layer 32, the molds 12, 14 may optionally be heated to increase the melt flow of the decorative layer to enable it to penetrate the texturing features of the surface 16.

Figure 3:
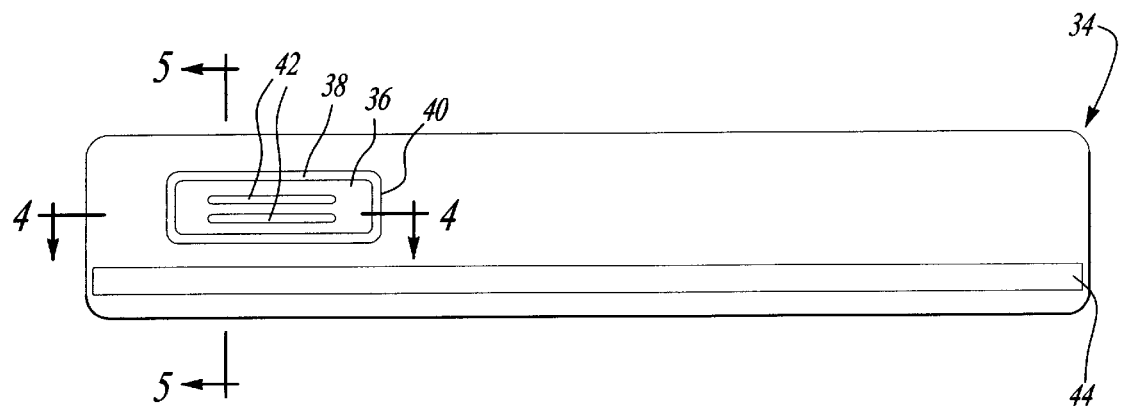
FIG. 3 is a plan view of an instrument panel made using the invention.

The molding operation forms an automotive instrument panel as illustrated in FIG. 3. The instrument panel 34 extends transversely inside of an automobile. The instrument panel 34 includes an integrally formed airbag door 36. The airbag door 36 includes a hinge 38 that enables the door 36 to swing open. The hinge 38 is formed during the molding operation as will be described in greater detail below. The airbag door includes an easily fracturable opening path 40. The opening path 40 is U-shaped and intersects the hinge 38. The door also includes two channel sections 42 that provide strength and rigidity to the airbag door 36. Also formed integrally with the instrument panel 34 is a transverse extending channel 44. The channel 44 may be utilized as a conduit for moving air through the instrument panel or as an area receiving a structural support for the vehicle.

Illustrated in FIG. 4 is a cross-sectional view of the instrument panel shown in FIG. 3 taken along the lines 4—4. The door 36 is made from a first wall 46 and a second wall 48. The first and second walls 46, 48 are the walls of the parison 26. The first wall 46 forms the backing surface of the instrument panel. The first wall 46 comprises the substrate layer 28. Because the backing surface of the instrument panel is not visible, it need not receive the decorative and foam layers. However, to simplify manufacture, it is possible to form the decorative and foam layers so as to completely surround the substrate layer 28.

The second wall 48 is made up of the substrate layer 28, the foam layer 30 and the decorative layer 32. The first and second walls 46, 48 are joined along the opening path 40. The first and second walls 46, 48 are joined in the molds 12, 14 during molding. As will be more fully described below, the opening path 40 is easily fracturable upon inflation of an airbag. Channels 42 strengthen and stiffen the door 36.

Illustrated in FIG. 5 is a cross-sectional view of the instrument panel taken along the lines 5—5 in FIG. 3. The hinge 38 is formed by contacting the first and second walls 46, 48. The contact occurs when the parison 26 is inflated between the closed molds 12, 14. The contact between the first and second walls 46, 48 is just sufficient for the two substrate layers 28 to melt and fuse. The wall thickness at the hinge 38 is roughly the combined thickness of the first and second walls 46, 48. An excess portion 50 is formed in the first wall in the vicinity of hinge 38. The excess portion 50 may be a pleat or curved section of the substrate layer 28. The excess portion 50 elongates around the hinge 38 when the door 36 is opened. The opening path 40 is formed by contacting the first and second walls 46, 48. The opening path 40 has a thickness much less than the combined thickness of the first and second walls 46, 48. The opening path 40 causes the first wall 46 to thin into a V-shape. The opening path 40 is easily fracturable upon inflation of an airbag. The opening path 40 is concealed beneath the decorative layer 32. The channels 42 provide stiffening and rigidity to the airbag door. The channel 44 may be used to transfer air transversely along the instrument panel or to conceal a structural member (not shown). It is also possible to transfer air in the interior portions of the instrument panel 34.

Optionally, the airbag door 36 may be additionally secured with a tether 52. The tether 52 may be made from spring steel. The tether 52 is inserted into the molds 12, 14 prior to extruding the parison. The parison 26 is extruded and contacts the tether 52. Barbs on the parison secure the tether to the parison wall. The tether 52 is made to elongate as the door 36 is opened and retain the door 36.

Another optional feather of the present invention is the inclusion of a structural foam 54 between the first and second walls 46, 48. The foam 54 is injected between the walls 46, 48 after the blowmolding operation. The foam 54 gives the instrument panel 34 additional rigidity and may be useful in absorbing energy. This is especially useful in the airbag door 36, which must be designed to absorb energy when in a closed position. The use of the foam 54 between the walls 46, 48 may preclude using this interior space for air handling, but it does provide thermal insulation to the channel 44. This thermal installation property of the foam increases the efficiency of vehicle air handling systems.

While the best modes for carrying out the invention have been described in detail, those familiar with the art to which this invention relates will recognize various alternative designs and embodiments for practicing the invention as defined by the following claims.

What is claimed:

1. A method of manufacturing a blow-molded instrument panel having a concealed integrally formed airbag door comprising the steps of:

extruding a parison having a substrate layer, said parison having a first wall and a second wall;

placing said parison in a mold;

inflating said parison and causing said parison to conform to the shape of said mold;

contacting said first and second walls to form a hinge;

contacting said first and second walls for forming an opening path that intersects said hinge to form an airbag door; and cooling said parison to form said panel, said substrate layer solidifying and becoming rigid and self-supporting, said door fracturing said opening path and folding along said hinge when contacted with an inflating airbag.

2. The method of claim 1, further comprising extruding a decorative layer adjacent to said substrate layer and joining said decorative layer to said substrate.

3. The method of claim 2, further comprising extruding a foam layer and joining said foam layer intermediate to said decorative and substrate layers.

4. The method of claim 1, wherein said second wall contains an elongatable section between said hinge and said opening path, said section elongating when said door is opened.

5. The method of claim 4, wherein said hinge is approximately the combined thickness of said first and second walls and said opening path is much thinner than the combined thickness of said first and second walls.

6. The method of claim 2, wherein said instrument panel includes an interior surface visible to the passenger compartment of a vehicle and said decorative layer extends over said interior surface.

7. The method of claim 2, wherein said substrate layer forms an endless loop and said decorative layer partially covers said endless loop.

8. The method of claim 2, wherein said decorative layer is selected from the group consisting of TPU, TPO or TPE and said substrate layer is selected from the group consisting of PE, PP or PC/ABS.

9. The method of claim 1, further comprising injecting structural foam between said first and second walls.

10. A method of manufacturing a blow-molded instrument panel having a concealed integrally formed airbag door comprising the steps of:

co-extruding a parison having a substrate layer and a decorative layer at least partially covering said substrate layer, said decorative and substrate layers forming a first wall and said parison having a second wall;

placing said parison in a mold;

inflating said parison and causing said parison to conform to the shape of said mold;

contacting said first and second walls to form a hinge;

contacting said first and second walls for form an opening path that intersects said hinge to form an airbag door; and cooling said parison to form said panel, said substrate layer solidifying and becoming rigid and self-supporting, said door fracturing said opening path and folding along said hinge when contacted with an inflating airbag.

* * * * *